United States Patent
Weiss (10) Patent No.: US 9,878,746 B2
(45) Date of Patent: Jan. 30, 2018

(54) DIFFUSER ARRANGEMENT

(71) Applicant: Dr. Ing. h.c. F. Porsche Aktiengesellschaft, Stuttgart (DE)

(72) Inventor: Thomas Weiss, Tamm (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/212,362

(22) Filed: Jul. 18, 2016

(65) Prior Publication Data

US 2017/0036710 A1 Feb. 9, 2017

(30) Foreign Application Priority Data

Aug. 7, 2015 (DE) .................. 10 2015 113 047

(51) Int. Cl.
    *B60J 9/00* (2006.01)
    *B62D 37/02* (2006.01)
    *B62D 35/02* (2006.01)

(52) U.S. Cl.
    CPC ............. *B62D 37/02* (2013.01); *B62D 35/02* (2013.01); *Y02T 10/88* (2013.01)

(58) Field of Classification Search
    CPC .. F21Y 2115/10; F21Y 2103/00; B62D 37/02; A61L 9/03; B01F 2003/04319; B29C 66/71; F02K 3/075; F24F 13/072; F04F 5/22; Y02T 50/671
    USPC ...................................................... 296/180.1
See application file for complete search history.

(56) References Cited

U.S. PATENT DOCUMENTS

| | | | | |
|---|---|---|---|---|
| 3,837,629 A | * | 9/1974 | Matras | B01F 3/04113 251/149.2 |
| 3,929,369 A | * | 12/1975 | Blair | B62D 35/001 296/180.3 |
| 4,206,942 A | * | 6/1980 | Nudo | B62D 35/00 105/1.2 |
| 4,465,947 A | * | 8/1984 | Armor | H02K 9/00 310/55 |
| 4,468,319 A | * | 8/1984 | Laakso | B01D 29/115 210/333.01 |
| 4,676,546 A | * | 6/1987 | Igel | B60J 7/22 296/217 |
| 5,059,358 A | * | 10/1991 | Tharp | B01F 3/04269 261/122.2 |
| 5,062,351 A | * | 11/1991 | Kloster | B60H 1/242 454/127 |
| 5,322,340 A | | 6/1994 | Sato et al. | |
| 6,286,899 B1 | * | 9/2001 | Hirschvogel | B60J 7/22 296/180.1 |

(Continued)

*Primary Examiner* — Kiran B Patel
(74) *Attorney, Agent, or Firm* — Gerald E. Hespos; Michael J. Porco; Matthew T. Hespos (57) ABSTRACT

A diffuser arrangement (1, 101, 201) for a motor vehicle has an air inlet region (3, 103, 203) and a diffuser channel (2, 102, 202, 303, 403). A first adjustable control element (4, 104, 204, 301, 401) and a second adjustable control element (5, 105, 205, 302, 402) are arranged in the diffuser channel (2, 102, 202, 303, 403). The first adjustable control element (4, 104, 204, 301, 401) controls the air flow through the diffuser channel (2, 102, 202, 303, 403). The second adjustable control element (5, 105, 205, 302, 402) selectively blocks the air inlet region (3, 103, 203) of the diffuser channel (2, 102, 202, 303, 403).

10 Claims, 6 Drawing Sheets

(56) References Cited

U.S. PATENT DOCUMENTS

| | | | | |
|---|---|---|---|---|
| 6,834,914 B2* | 12/2004 | Bohm | ............... | B60J 7/22 |
| | | | | 296/180.3 |
| 8,662,453 B2* | 3/2014 | Richards | ............... | F01D 5/145 |
| | | | | 244/207 |
| 9,669,885 B1* | 6/2017 | Fahland | ............... | B62D 37/02 |
| 2002/0084677 A1* | 7/2002 | Dittrich | ............... | B60J 7/22 |
| | | | | 296/217 |
| 2013/0110356 A1* | 5/2013 | Konishi | ............... | B60K 11/085 |
| | | | | 701/49 |
| 2015/0345578 A1* | 12/2015 | Nightingale | ............... | B60K 11/085 |
| | | | | 188/264 AA |
| 2015/0353149 A1* | 12/2015 | Wolf | ............... | B62D 35/007 |
| | | | | 296/180.5 |
| 2016/0272258 A1* | 9/2016 | Gibson | ............... | F16D 65/847 |
| 2017/0151984 A1* | 6/2017 | Bray | ............... | B62D 35/007 |
| 2017/0240224 A1* | 8/2017 | Gaylard | ............... | B62D 35/005 |

* cited by examiner

DIFFUSER ARRANGEMENT

CROSS REFERENCE TO RELATED APPLICATION

This application claims priority under 35 USC 119 to German Patent Appl. No. 10 2015 113 047.5 filed on Aug. 7, 2015, the entire disclosure of which is incorporated herein by reference.

BACKGROUND

1. Field of the Invention

The invention relates to a diffuser arrangement for a motor vehicle, having a diffuser channel and a control element for controlling air flow through the diffuser channel.

2. Description of the Related Art

Front diffusers are used on the front end of a vehicle, and rear diffusers are used on the rear end of a vehicle to achieve a targeted airflow under the vehicle to improve the downforce of the motor vehicle. The term diffuser as used in motor vehicles in motorsport refers to active surfaces in the underbody region of a motor vehicle. An active surface of this type also can be referred to as a diffuser channel and can improve the aerodynamics by way of a suction action. A diffuser may have an asymmetrical shape to achieve a pressure distribution in the underbody, and thus additional downforce.

U.S. Pat. No. 5,322,340 discloses diffuser arrangements with flaps as control elements. The flaps are arranged at the end side of the respective diffuser channel and allow the flow through the diffuser channel to be adjusted.

It has been found, however, that the flap arranged at the end side of the diffuser channel permits dirt to be introduced into the diffuser channel. The dirt can accumulate in the diffuser channel and may impair the downforce of the motor vehicle, for example because the flow through the diffuser channel is reduced or because the actuation of the flaps is disrupted.

It is therefore the object of the invention to provide a diffuser arrangement that is of simple construction, and to permit a controllable flow through the diffuser channel of the diffuser arrangement with reduced fouling of the diffuser channel.

SUMMARY

The invention relates to a diffuser arrangement for a motor vehicle. The diffuser arrangement has an air inlet region and a diffuser channel for a throughflow of air. A first adjustable control element is arranged in the diffuser channel for controlling the air flow through the diffuser channel, and a second adjustable control element is arranged in the diffuser channel for selectively blocking the air inlet region of the diffuser channel. In this way, the diffuser channel of a front diffuser can be substantially closed off or blocked to prevent fouling. The first control element may be a so-called aeroflap that defines the flow through the diffuser channel, and the second control element may be a protective flap to reduce or prevent an introduction of dirt. The second control element can be moved into an operating position in which the diffuser channel is opened, and the flow through the diffuser channel then can be controlled by adjusting the first control element. The free cross section of the diffuser channel can be opened to a greater or lesser extent depending on the setting or angle of inclination.

The first and second adjustable control elements can be arranged one behind the other in an air flow direction. Thus, the second control element can be upstream of the first control element in the air flow direction, such that the incoming air first flows to the second control element and is possibly blocked there, or otherwise also flows to the first control element.

The first adjustable control element and/or the second adjustable control element may be a single-vane flap with a rotary spindle arranged adjacent to a wall of the diffuser channel. The spindle of a single-vane flap requires only a small structural space for fastening and mounting the flap. In this way, it is possible for the flap to be pivoted virtually completely out of the air flow if necessary.

It is also advantageous if the first and second adjustable control elements are adjustable by at least one actuator, such as a common actuator to achieve automated actuation and adjustment of the control elements. A single actuator to drive the first and second control elements reduces the costs and the weight associated with a second actuator. In the case of racing vehicles, the lower weight plays a major role, whereas in the case of mass-production vehicles, the lower costs are particularly advantageous. However, it is possible to use two lightweight and inexpensive actuators.

The actuator may be an electromotive actuator, a hydraulic actuator and/or a pneumatic actuator. The electromotive actuator can be controlled in a highly effective manner even in intermediate positions. The hydraulic or pneumatic actuator can be of simple, lightweight and possibly inexpensive design.

A drive connection may be between the actuator and the first and second adjustable control elements for coupling the first and second adjustable control elements to the actuator. The drive connection may be a mechanism that couples the first and second adjustable control elements to the actuator. The type of drive connection may define the way the adjustable control elements move relative to one another.

The mechanism of the drive device may be a cam mechanism, a cable pull mechanism, a gearwheel mechanism or some other mechanism. It is thus possible to provide simple coupling with good power transmission. A cam mechanism advantageously enables different movement paths to be implemented. A cable pull mechanism requires only a small amount of structural space in the region of the control elements.

The first adjustable control element can be acted on by a first force store and/or the second adjustable control element can be acted on by a second force store. In this way, the movement in one direction or the other can take place counter to the restoring force of the corresponding force store, thereby realizing good controllability and a simple restoring action in the direction of the restoring force.

The first force store and/or the second force store may be a leg spring and/or a compression spring. The leg spring can be arranged to save structural space around the spindle or rotary spindle of the control element. The compression spring also can be arranged to save structural space, and may be supported against the control element in some other way, advantageously with a space from the rotary spindle.

The first adjustable control element arranged in the diffuser channel and the second adjustable control element arranged in the diffuser channel may be movable in each case from a first operating position, in which the diffuser channel is blocked, into a second operating position, in which the diffuser channel is opened. The second control element is actuated out of the first operating position temporally before the first control element. In this way, the second control element, which blocks the diffuser channel, eliminates the blocking action before the fine adjustment of the flow through the diffuser channel is effected by the first control element.

The invention will be discussed below in detail on the basis of an exemplary embodiment and with reference to the drawing.

DETAILED DESCRIPTION

Figure 1:
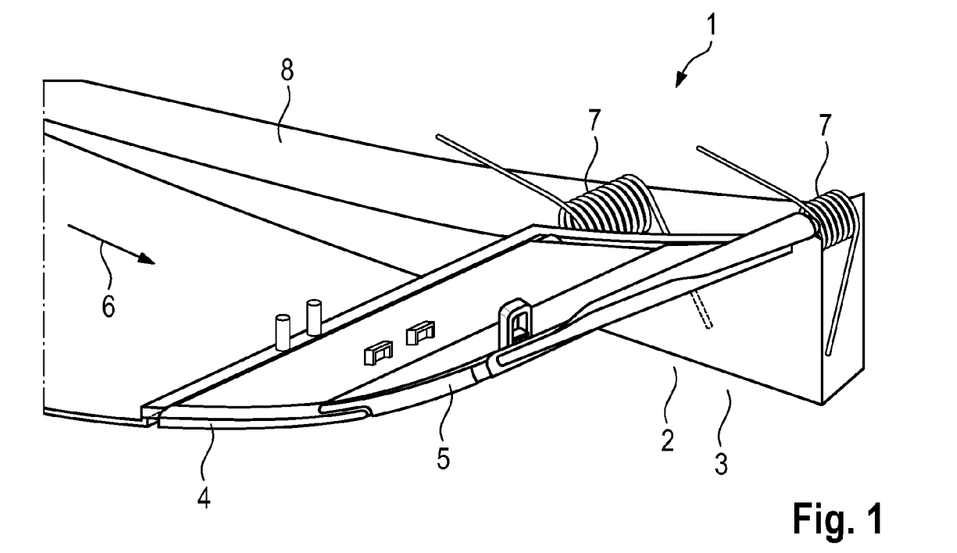
FIG. 1 is a schematic partial view of a diffuser channel with two control elements in a first operating position.

FIG. 1 is a partial view a diffuser arrangement 1 having a diffuser channel 2. The diffuser channel 2 is designed to be open downwardly open and has an air inlet region 3 that receives an inflow of air into the diffuser channel 2. Air can flow through the diffuser channel 2.

The diffuser arrangement 1 is a front-end diffuser arrangement on a front end of a motor vehicle. However, the diffuser arrangement 1 could also be a rear-end diffuser arrangement.

A first adjustable control element 4 is disposed in the diffuser channel 2 and controls the air flow through the diffuser channel 2. A second adjustable control element is arranged in the diffuser channel 2 and enables the air inlet region 3 of the diffuser channel 2 to be blocked.

The first and second control elements 4, 5 are arranged one behind the other in an air flow direction 6 so that the second control element 5 is arranged behind and say downstream of the first control element 4, in the air flow direction 6.

Figure 2:
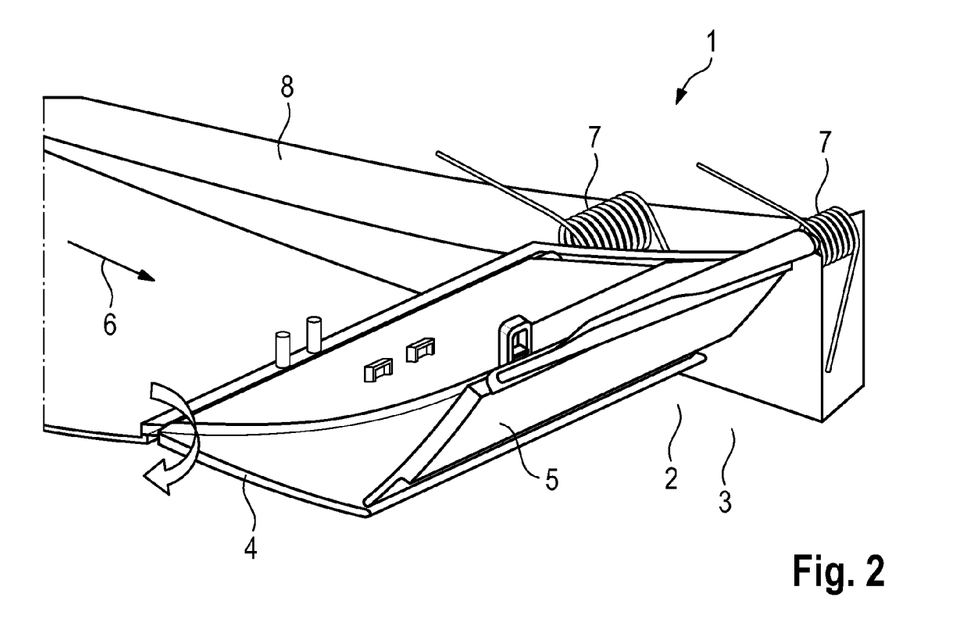
FIG. 2 is a schematic partial view of a diffuser channel with two control elements in a second operating position.

The two control elements 4, 5 can be driven and thus adjusted by at least one actuator (not illustrated). The control elements 4, 5 are acted on by force stores 7, for example spring elements, so as to be adjustable counter to the restoring force of the respective force store 7. In the embodiment of FIGS. 1 and 2, the force store 7 is in the form of a leg spring.

A shown in FIG. 1 the two control elements are in the form of single-vane flaps that have rotary spindles adjacent an upper wall 8 of the diffuser channel 2.

FIG. 1 shows the diffuser arrangement 1 in a second operating position so that the two control elements 4, 5 are in an upper operating position and open up the diffuser channel. The two control elements 4, 5 are arranged approximately on a line, and bear substantially against the upper wall 8.

FIG. 2 shows the diffuser arrangement 1 in a first operating position so that the two control elements 4, 5 are in a lower operating position and substantially block the diffuser channel. More particularly, the first control element 4 is approximately horizontal, and the second control element 5 is aligned at an angle of up to approximately 45° with respect to the vertical and at an obtuse angle to the first control element 4. In this way, the air inlet region 3 is blocked, and it is also possible for substantially no dirt to enter the diffuser channel 2. The obtuse angle has the effect that the arrangement is also not sensitive to impacts from below.

The force stores 7 brace the control elements 4, 5 into the closed first operating position, and the actuator opens the control elements into the second, open operating position counter to the restoring force of the force stores 7.

The control elements 4, 5 are flaps, as shown in FIGS. 1 and 2, and optionally are encircled at least partially by a sealing lip, for example as a soft component. The sealing lips also prevent jamming of the flaps.

Figure 3:
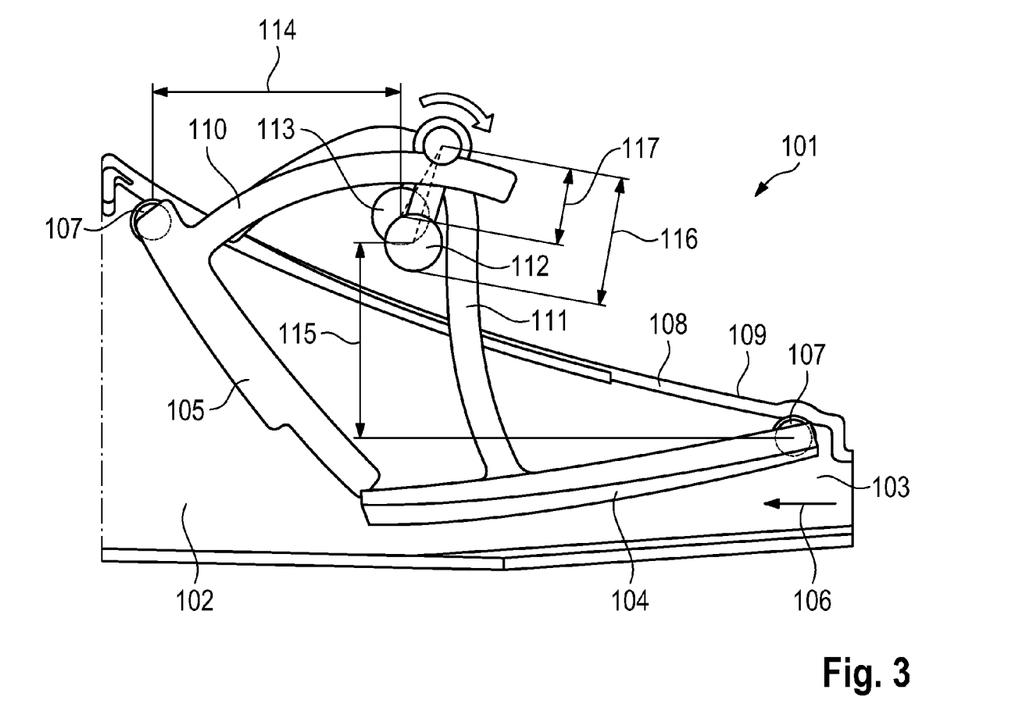
FIG. 3 is a side view of an embodiment of a diffuser channel with two control elements.

FIG. 3 shows an embodiment of a diffuser arrangement 101 having a diffuser channel 102. The second control element 105 is a flap is arranged adjacent to the air inlet region 103, and the first control element 104 is a flap is positioned upstream of the second control element 105 in an air flow direction 106. Each control element 104, 105 has a rotary spindle 107 arranged at the top in the region of the wall 108 of the diffuser channel. The wall 108 has a set-back 109, and the control elements 104, 105 can be recessed in the set-back 109 when in the second operating position.

Curved tracks 110, 111 are arranged on the control elements 104, 105 and cooperate with cams 112, 113 of a cam mechanism. The cam 112 is supported on the curved track 111, and the cam 113 is supported on the curved track 110. This gives rise to the levers 114, 115 with the cam radii 116, 117. The cams are rotated by an actuator, such that the control elements are displaced. Proceeding from the first operating position, the control element 105 is firstly rotated before the control element 104 is rotated.

The curved tracks 110, 111 are in the form of swan-shaped levers. Here, the control element 104 initially is moved down slightly, so that the control element 105 can pivot freely upward before the control element 104 is moved up again.

Figure 4:
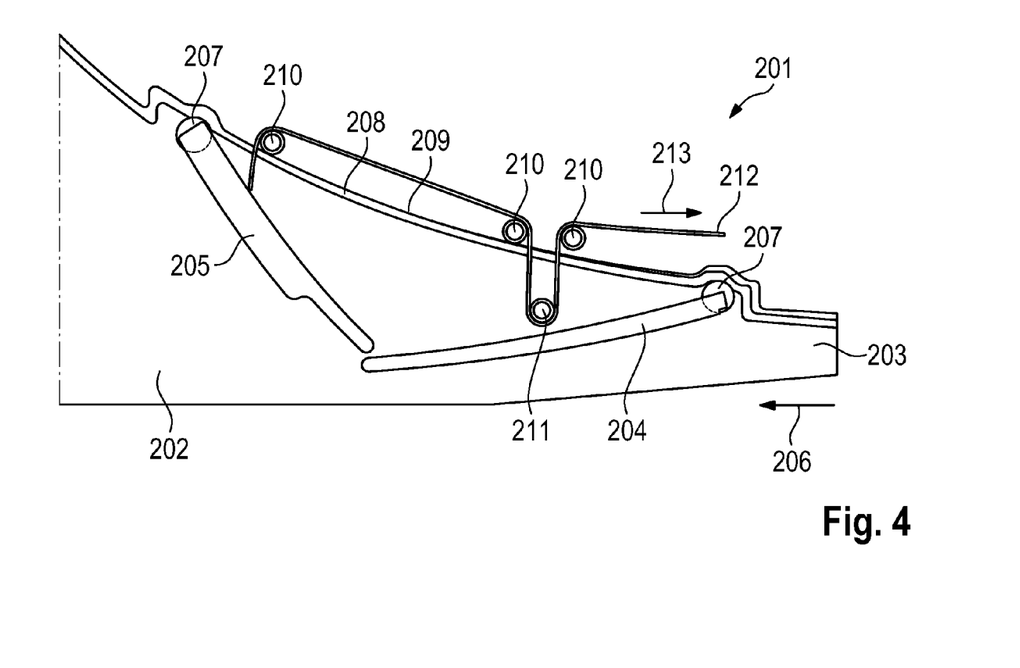
FIG. 4 shows a side view of a further embodiment of a diffuser channel with two control elements.

FIG. 4 shows a further embodiment of a diffuser arrangement 201 having a diffuser channel 202. The second control element 205 is a flap arranged adjacent to the air inlet region 203, and the first control element 204 is a flap is positioned upstream of the second control element 205 in an air flow direction 206. Each control element 204, 205 has a rotary spindle 207 arranged at the top in the region of the wall 208 of the diffuser channel 202. The wall 208 has a set-back 209, and the control elements 204, 205 can be received therein in the second operating position.

A cable 212 of a cable pull mechanism is articulated, by way of diverting rollers 210, 211 on the control elements 204, 205. The cable 212 is connected at one end to the control element 205 and runs around the diverting rollers 210, which are arranged in a static fashion. The diverting roller 211 is connected to, and mounted rotatably on, the control element 204. If the cable 212 is pulled in the arrow direction 213, the control elements 204, 205 are lifted. The closing force of the control element 205 is lower than the closing force of the control element 204. If a force F is applied to the cable 212, the control element 205 moves up as far as the stop. The force on the cable subsequently increases, and the control element 204 is moved up. A cable pull apparatus is formed on the control element 204 by way of the roller that is articulated on the control element. In this way, twice the cable force is utilized for lifting the control element 204. The total cable travel of the cable 212 is the sum of the lift travel of the control element 205 and two times the lift travel of the control element 204.

Figure 5:
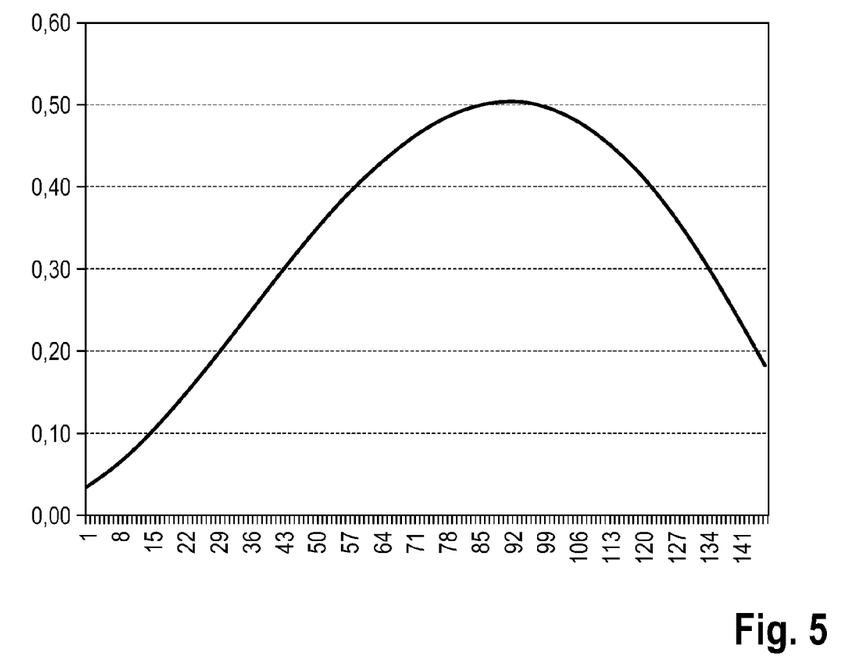
FIG. 5 is a characteristic curve of the torque as a function of the actuation travel in the case of the embodiment of FIG. 3.

FIG. 5 shows a characteristic curve of the torque as a function of the actuation travel for the embodiment of FIG. 3. It can be seen that the cam drive acts counter to the preload of a force store, and the torque passes through a maximum.

Figure 6:
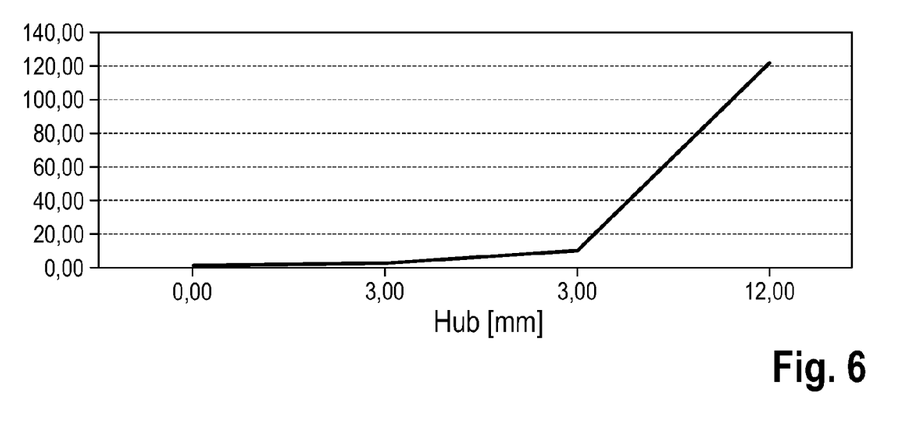
FIG. 6 is a characteristic curve of the torque as a function of the actuation travel in the case of the exemplary embodiment of FIG. 4.

FIG. 6 shows a characteristic curve of the tensile force as a function of the actuation travel for embodiment of FIG. 4. A low tensile force prevails for the actuation of the control element 205, and the tensile force increases for the actuation of the control element 204.

Figure 7:
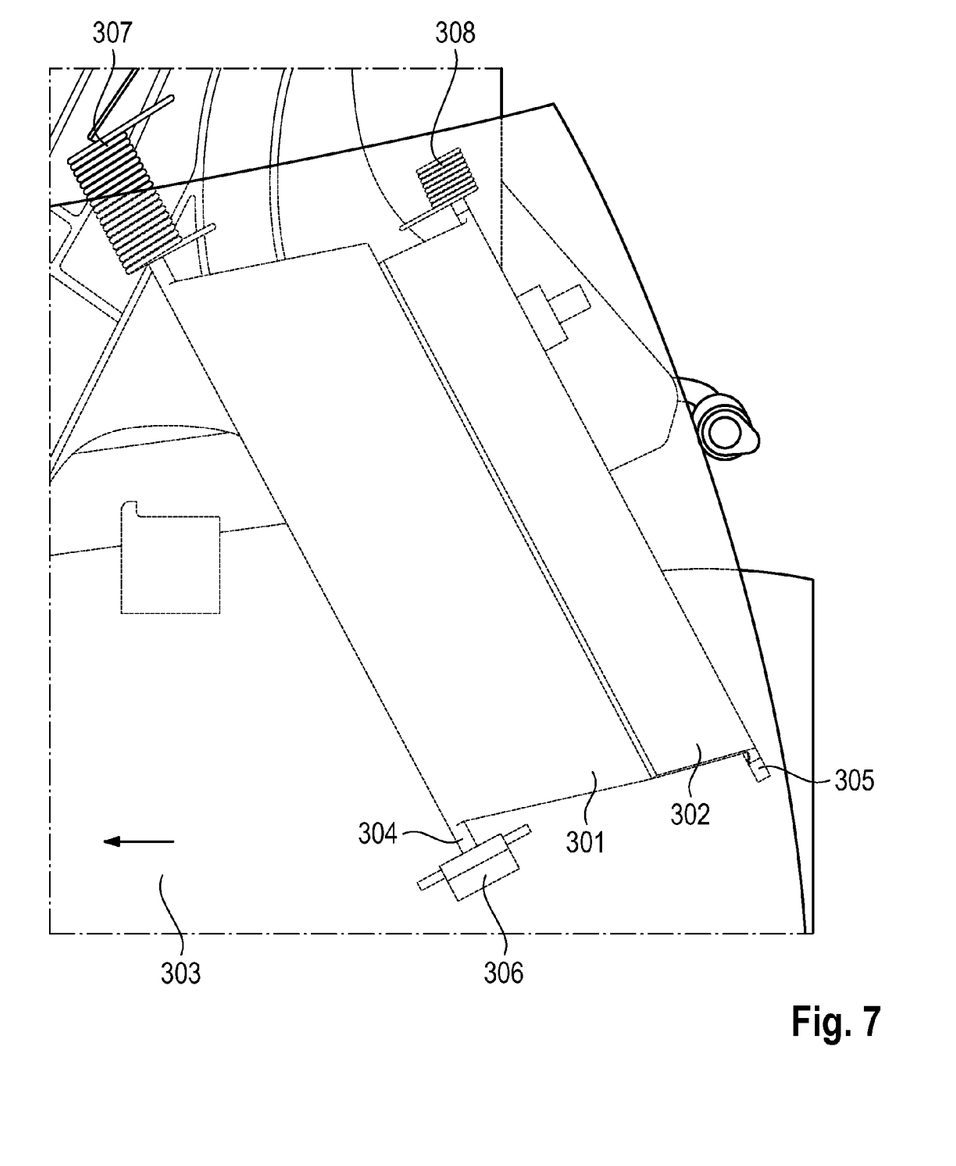
FIG. 7 is a view from below of a further embodiment of a diffuser channel with two control elements.

FIG. 7 shows a further embodiment with two control elements 301, 302 in a diffuser channel 303 as viewed from below. The control elements 301, 302 are in the form of single-vane flaps and have rotary spindles 304, 305 arranged at opposite ends. A rotation sensor 306 is articulated on at least one of the rotary spindles 304, 305 to determine the angular position of the respectively monitored flap. Leg springs 307, 308 as force stores are articulated on the two control elements 301, 302 and force the control elements into the first, closed operating position.

Figure 8:
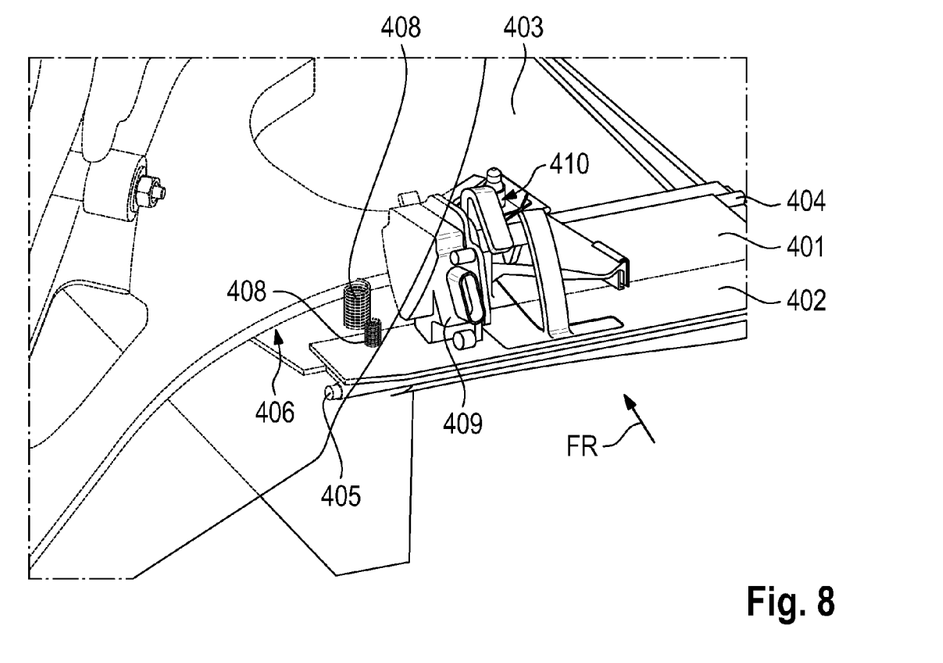
FIG. 8 is a view of a further embodiment of a diffuser channel with two control elements.

FIG. 8 shows a further embodiment with two control elements 401, 402 in a diffuser channel 403 as viewed from the front. The control elements 401, 402 are single-vane flaps with rotary spindles 404, 405 arranged at opposite ends. A rotation sensor 406 is articulated on at least one of the rotary spindles 404, 405 to determine the angular position of the respectively monitored flap. Compression springs 408 as force stores are articulated on the two control elements and force the control elements into the first, closed operating position. The actuator 409 with cam mechanism 410 is arranged above the control elements 401, 402 and may be an electric motor or the like.

Figure 9:
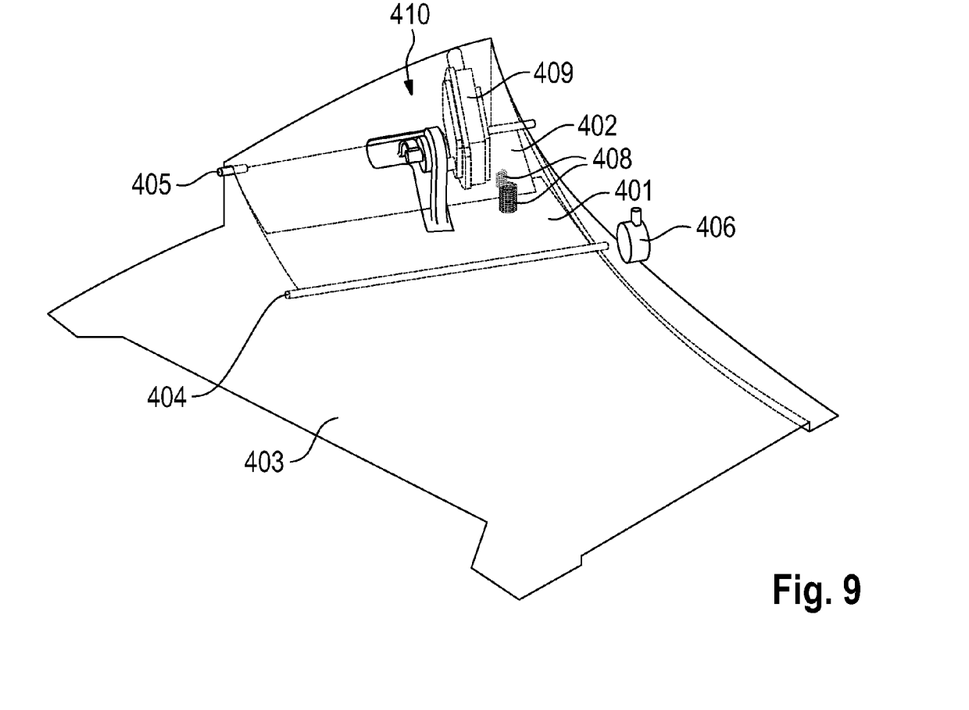
FIG. 9 is a further view of the embodiment of FIG. 8.

FIG. 9 shows the arrangement from another perspective. The cam mechanism corresponds approximately to the mechanism of FIG. 3. The actuator 409 with the cam mechanism 410 may be arranged outside the diffuser channel 403. The curved tracks extend out of the diffuser channel 403 through openings of the upper wall of the diffuser channel. The openings advantageously are sealed off.

Figure 10:
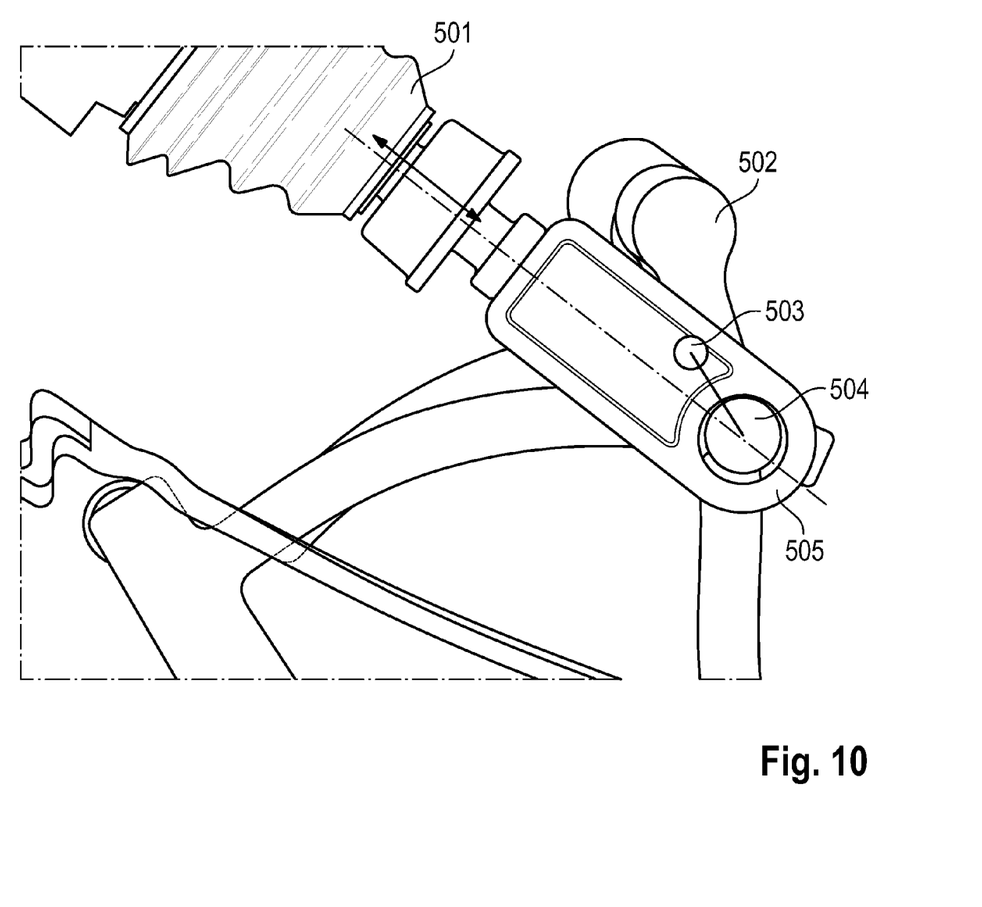
FIG. 10 is a view of an arrangement of an actuator having a cam mechanism.

FIG. 10 shows an alternate actuator 501 for rotating a cam lever 502 of the cam mechanism. The cam lever 502 rotates about the rotary spindle 503. A peg 504 is arranged on the cam lever 502 outside the rotary spindle 503 and is articulated, for example, by a displaceable element 505 of the actuator 501. Displacement of the element 505 rotates the cam lever 502 so that the control elements can be displaced.

The control elements shown are single-vane flaps, but may be of some other form.

As an alternative to the electromotive actuator discussed above, the actuator may be a hydraulic actuator and/or a pneumatic actuator, for example a vacuum capsule.

As an alternative to the cam mechanism shown or to the cable pull mechanism shown, the mechanism may also be in the form of a gearwheel mechanism or some other mechanism.

As an alternative to the design of a first force store and/or of a second force store as a leg spring and/or as a compression spring, the respective force store may also be of some other form.

In the various figures, the air flow direction has been indicated by way of arrows. The air flow direction is typically oriented counter to the direction of travel of the motor vehicle.

LIST OF REFERENCE DESIGNATIONS

1 Diffuser arrangement
2 Diffuser channel
3 Air inlet region
4 Control element
5 Control element
6 Air flow direction
7 Force store
8 Wall
101 Diffuser arrangement
102 Diffuser channel
103 Air inlet region
104 Control element
105 Control element
106 Air flow direction
107 Rotary spindle
108 Wall
109 Set-back portion
110 Curved track
111 Curved track
112 Cam
113 Cam
114 Lever
115 Lever
116 Cam radii
117 Cam radii
201 Diffuser arrangement
202 Diffuser channel
203 Air inlet region
204 Control element
205 Control element
206 Air flow direction
207 Rotary spindle
208 Wall
209 Set-back portion
210 Diverting rollers
211 Diverting rollers
212 Cable
213 Arrow direction
301 Control element
302 Control element
303 Diffuser channel
304 Rotary spindle
305 Rotary spindle
306 Rotation sensor
307 Leg spring
308 Leg spring
401 Control elements
402 Control elements
403 Diffuser channel
404 Rotary spindle
405 Rotary spindle
406 Rotation sensor
408 Compression spring
409 Actuator
410 Cam mechanism
501 Actuator 502 Cam lever
503 Rotary spindle
504 Peg
505 Element

What is claimed is:

1. A diffuser arrangement (1, 101, 201) for a motor vehicle, comprising an air inlet region (3, 103, 203), a diffuser channel (2, 102, 202, 303, 403) for a throughflow of air and a adjustable control element (4, 104, 204, 301, 401) for controlling the air flow through the diffuser channel (2, 102, 202, 303, 403) and provided a second adjustable control element (5, 105, 205, 302, 402) for selectively blocking the air inlet region (3, 103, 203) of the diffuser channel (2, 102, 202, 303, 403).

2. The diffuser arrangement (1, 101, 201) of claim 1, wherein the first adjustable control element (4, 104, 204, 301, 401) and the second adjustable control element (5, 105, 205, 302, 402) are arranged one behind the other in an air flow direction (6, 106, 206).

3. The diffuser arrangement (1, 101, 201) of claim 2, wherein at least one of the first adjustable control element (4, 104, 204, 301, 401) and the second adjustable control element (5, 105, 205, 302, 402) is a single-vane flap that has a rotary spindle (107, 207, 304, 305, 404, 405, 503) arranged adjacent to a wall (8, 108, 208) of the diffuser channel (2, 102, 202, 303, 403).

4. The diffuser arrangement (1, 101, 201) of claim 1, wherein the first adjustable control element (4, 104, 204, 301, 401) and the second adjustable control element (5, 105, 205, 302, 402) are adjustably driven by at least one actuator (409, 501).

5. The diffuser arrangement (1, 101, 201) of claim 4, wherein the actuator (409, 501) is an electromotive actuator, a hydraulic actuator and/or a pneumatic actuator.

6. The diffuser arrangement (1, 101, 201) of claim 4, further comprising a drive connection between the actuator (409, 501) and the first adjustable control element (4, 104, 204, 301, 401) and the second adjustable control element (5, 105, 205, 302, 402), the drive connection defining a mechanism that couples the first adjustable control element (4, 104, 204, 301, 401) and the second adjustable control element (5, 105, 205, 302, 402) to the actuator (409, 501).

7. The diffuser arrangement (1, 101, 201) of claim 6, wherein the mechanism is a cam mechanism (410), a cable pull mechanism or a gearwheel mechanism.

8. The diffuser arrangement (1, 101, 201) of claim 1, further comprising a first force store (7) that acts on the first adjustable control element (4, 104, 204, 301, 401) and a second force store (7) that acts on the second adjustable control element (5, 105, 205, 302, 402).

9. The diffuser arrangement (1, 101, 201) of claim 8, wherein the first force store (7) and/or the second force store (7) is a leg spring (307, 308) and/or a compression spring (408).

10. The diffuser arrangement (1, 101, 201) of claim 1, wherein the first adjustable control element (4, 104, 204, 301, 401) and the second adjustable control element (5, 105, 205, 302, 402) are movable from a first operating position in which the diffuser channel is blocked and a second operating position in which the diffuser channel (2, 102, 202, 303, 403) is opened, wherein the second control element (5, 105, 205, 302, 402) is actuated out of the first operating position temporally before the first control element (4, 104, 204, 301, 401).

* * * * *